United States Patent [19]
Ikegame

[11] Patent Number: 6,061,164
[45] Date of Patent: May 9, 2000

[54] OPTICAL ELEMENT SUPPORTING APPARATUS

[75] Inventor: Tetsuo Ikegame, Hachioji, Japan

[73] Assignee: Olympus Optical Co., Ltd., Tokyo, Japan

[21] Appl. No.: 09/236,506

[22] Filed: Jan. 25, 1999

[30] Foreign Application Priority Data

Jan. 27, 1998 [JP] Japan .................................. 10-013971

[51] Int. Cl.$^7$ .................................................. G02B 26/08
[52] U.S. Cl. .......................... 359/224; 359/198; 359/199; 359/213; 359/214; 359/223
[58] Field of Search .................... 359/198–200, 359/223, 224, 811, 813, 819, 822, 871, 872, 209–214, 226; 185/37, 45

[56] References Cited

U.S. PATENT DOCUMENTS 5,280,377  1/1994  Chandler et al. ........................ 359/196

FOREIGN PATENT DOCUMENTS

5-314518  11/1993  Japan .

*Primary Examiner*—James Phan
*Attorney, Agent, or Firm*—Frishauf, Holtz, Goodman, Langer & Chick, P.C.

[57] ABSTRACT

The portion close to a rotation axis, of an S-shaped spring portion of a spring consisting of a plate material and supporting a movable member has a narrow width and a portion distant from the rotation axis has a large width. Therefore, if the movable member is rotated, the portion close to the rotation axis has a small spring constant due to bending deformation in the plate thickness direction. If the movable member is moved in other directions, the respective parts of the spring have a large spring constant due to bending deformation and shearing deformation in the surface direction. The accuracy of the supporting spring apparatus is thereby enhanced.

4 Claims, 7 Drawing Sheets

FIG. 13
PRIOR ART

OPTICAL ELEMENT SUPPORTING APPARATUS

BACKGROUND OF THE INVENTION

The present invention relates to a supporting apparatus for an objective lens used in an optical device such as an optical scanner or the like or used in a data recording/reproducing apparatus which records/writes data with respect to an optical recording medium such as an optical disk drive, postscript type disk drive, phase change disk drive, CD-ROM, DVD, optical card, or the like, and also relates to a supporting spring apparatus for an optical movable part for rotatably supporting a galvano mirror for use in an optical device such as, for example, an optical scanner.

Conventionally, an optical element internally having a movable part or a movably supported optical element is used in various optical devices as described above. For example, in an optical element such as a galvano mirror, an optical constituent element such as an internal mirror or the like is rotatably supported.

In many cases, a supporting apparatus based on a spring has been conventionally used as an apparatus for rotatably supporting an optical constituent element or optical element of a small size. The supporting apparatus of this type supports a movable part by a spring, and the movable part is rotatably supported about a predetermined axis.

Since the supporting apparatus using the spring as stated above allows the movable member to be rotated by the deformation of the spring, the apparatus has a predetermined restoring force, i.e., a predetermined spring constant if the movable member rotates. The supporting apparatus of this type preferably possesses characteristics of having a small spring constant in a case where the movable member rotates about the rotation axis and having a small spring constant in a case where the movable member moves in a direction perpendicular to the rotation axis. With such characteristics, this movable member is rotatable about the predetermined rotation axis with a small resistance and moves less in a direction perpendicular to the rotation axis, with the result that the movable member is accurately, rotatably supported about the predetermined rotation axis.

Figure 13:
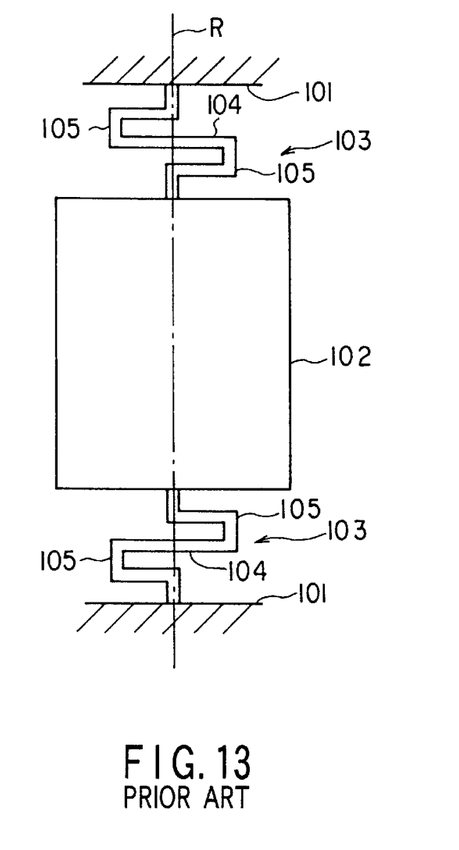
FIG. 13 is a schematic plan view of a conventional spring supporting apparatus.

Due to this, according to the conventional supporting spring apparatus stated above, a curved spring is used as shown in FIG. 13. Specifically, in FIG. 13, reference numeral 101 denotes a fixed member on a fixed side and 102 denotes a movable member. The movable member 102 is rotatably supported about a predetermined rotation axis R with respect to the fixed member 101 by a pair of springs 103. Each of the springs 103 is formed out of a thin plate of spring material such as beryllium-copper alloy and is curved. The central portion 104 of the curved spring 103 is positioned in the neighborhood of the rotation axis R. whereas the curved portions 105 on both ends thereof are positioned distant from the rotation axis R.

If the movable member 102 is rotated, the central portion in the neighborhood of the rotation axis R and the both fixed end portions of the spring 103 have the highest bending stress. As a result, bending deformation centered about the central portion 104 occurs to thereby rotatably support the movable member 102 about the rotation axis R. In addition, if the movable member is moved in a direction perpendicular to the rotation axis R, parallel to, for example, the longitudinal direction of FIG. 13 or perpendicular to the longitudinal direction of FIG. 13, then bending or shear deformation occur to the respective portions of the curved spring 103 in a direction parallel to the plane direction thereof, respectively.

Since the spring 103 is of thin plate shape, the ratio of a plate thickness to a width is high. Owing to this, rigidity, i.e., a spring constant against simple bending deformation in a direction perpendicular to the plane direction or in a plate thickness direction become the smallest, whereas rigidity, i.e., a spring constant against twisting deformation or bending or shearing deformation along plane direction is larger. If the movable member 102 is rotated, that is, if simple bending deformation in the plate thickness direction occurs to the central portion 104, the movable member 102 has a small spring constant. If the movable member 102 is moved in a direction perpendicular to the rotation axis R, that is, if bending or shearing deformation along plane direction occurs to the respective portions of the movable member 102, then the member 102 has a large spring constant. This makes it possible that the movable member 102 is rotatably supported about the rotation axis R with a low resistance and that the moving amount of the movable member 102 in the direction perpendicular to the rotation axis is smaller, thereby accurately supporting the movable member 102.

In the supporting spring apparatus of this type, it is preferable that the displacement in the direction perpendicular to the rotation axis R is as little as possible. To do so, the width of the curved spring 103 is preferably large. If the curved spring 103 is wider, the spring constant at which the central portion 104 is subjected to bending deformation becomes larger accordingly. The resistance with which the movable member 102 is rotated becomes disadvantageously higher.

BRIEF SUMMARY OF THE INVENTION

The present invention has been made under the above-stated circumstances. It is an object of the present invention to provide a supporting apparatus which supports a movable member using a curved spring of a thin plate material and which can accurately support the movable member about a rotation axis by making the spring constant of the spring about the rotation axis of the movable member small and that of the spring moved in a direction perpendicular to the rotation axis large.

To attain the above object, a section supporting apparatus using a spring according to the present invention, comprises a fixed member, a movable member having at least an optical element or optical constituent element installed therein, the spring rotatably supporting the movable member about a predetermined rotation axis with respect to the fixed member, the spring consisting of a plate material and having a curved-shape, and wherein a portion of the spring positioned close to the rotation axis has a narrow width and a portion distant from the rotation axis has a large width.

Therefore, if the movable member rotates about the rotation axis, the portion of the spring in the vicinity of the rotation axis has bending deformation in the plate thickness direction. Since the width of the portion is made narrow, the spring constant about the rotation axis is small. In addition, if the movable member 102 is moved in a direction perpendicular to the rotation axis, the respective parts of the curved spring have bending deformation and shearing deformation in a direction along the surface direction. Since the portion distant from the rotation axis has a large width, the spring constant of the distant portion is large. Due to this, the spring has a large spring constant with respect to bending deformation and shearing deformation along the surface direction and has less displacement in the direction perpendicular to the rotation axis of the movable member. As a result, it is possible to accurately, rotatably support the movable member about the predetermined rotation axis.

In addition, according to a preferred embodiment, the spring has a smoothly curved S-shape symmetrical with respect to a central plane, a central portion and both end portions of the spring are positioned close to the rotation axis, a curbed portion of the spring is positioned distant from the rotation axis and a width of the curved portion of the spring is set larger than a width of the central portion and widths of the both end portions.

Since the spring is smoothly curved S-shaped, stress does not locally concentrate while the spring is being deformed. Thus, the apparatus can exhibit high reliability. Besides, simple bending deformation in the plate thickness direction during rotation occur or center around three portions, i.e., the both end portions and the central portion of movable member. The rotation axis is a straight line passing the three points. It is, therefore, possible to accurately control the direction, that is, the inclination of the rotation axis.

Further, according to a preferred embodiment, the movable member holds a mirror of a galvano mirror and the S-shaped spring consisting of the plate member is positioned in a plane perpendicular to a reflection surface of the mirror. Since the S-shaped curved spring is arranged in a clearance between the movable member and the fixed member in a direction perpendicular to the reflection surface, it suffices to form an S-shaped curved clearance for containing the S-shaped spring between the movable member and the fixed member. Thus, it is possible to reduce dimensions of the apparatus in the rotation axis direction and to provide a smaller-sized apparatus.

Moreover, an optical system movable section supporting apparatus using a spring according to the present invention comprises a fixed member, a movable member having at least an optical element or optical constituent element installed therein and the spring rotatably supporting the movable member about a predetermined rotation axis with respect to the fixed member, the spring consisting of a plate material and curved to have a curved portion forming a folded part, wherein a width of the curved portion of the spring is set larger than widths of other portions of the spring.

Since the curved portion, which is less deformed if the movable member rotates about the rotation axis, is formed to have a large width, the spring has a small spring constant with respect to deformation about the rotation axis and the curved portion of the spring has a large spring constant with respect to bending deformation or shearing deformation along the surface direction of the spring if the movable member is moved in the direction perpendicular to the rotation axis. Thus, the spring has a large spring constant with respect to the bending deformation and shearing deformation along the surface direction of the overall spring. As a result, the displacement of the spring in the direction perpendicular to the rotation axis of the movable member is made small, thereby making it possible to accurately, rotatably support the movable member about a predetermined rotation axis.

BRIEF DESCRIPTION OF THE SEVERAL VIEWS OF THE DRAWING

The present invention will be understood more clearly from the drawings below integrated as a part in the present specification, the explanation above in the brief summary of the invention, and the detailed description of preferred embodiment described below.

DETAILED DESCRIPTION OF THE INVENTION

In the following, one embodiment of the present invention will be described with reference to the accompanying drawings. In this embodiment, the present invention is applied to an apparatus for supporting a movable portion of a galvano mirror used in a light pick-up device in a data recording/reproducing apparatus using a magneto-optical disk as a recording medium.

Figures 1, 2:
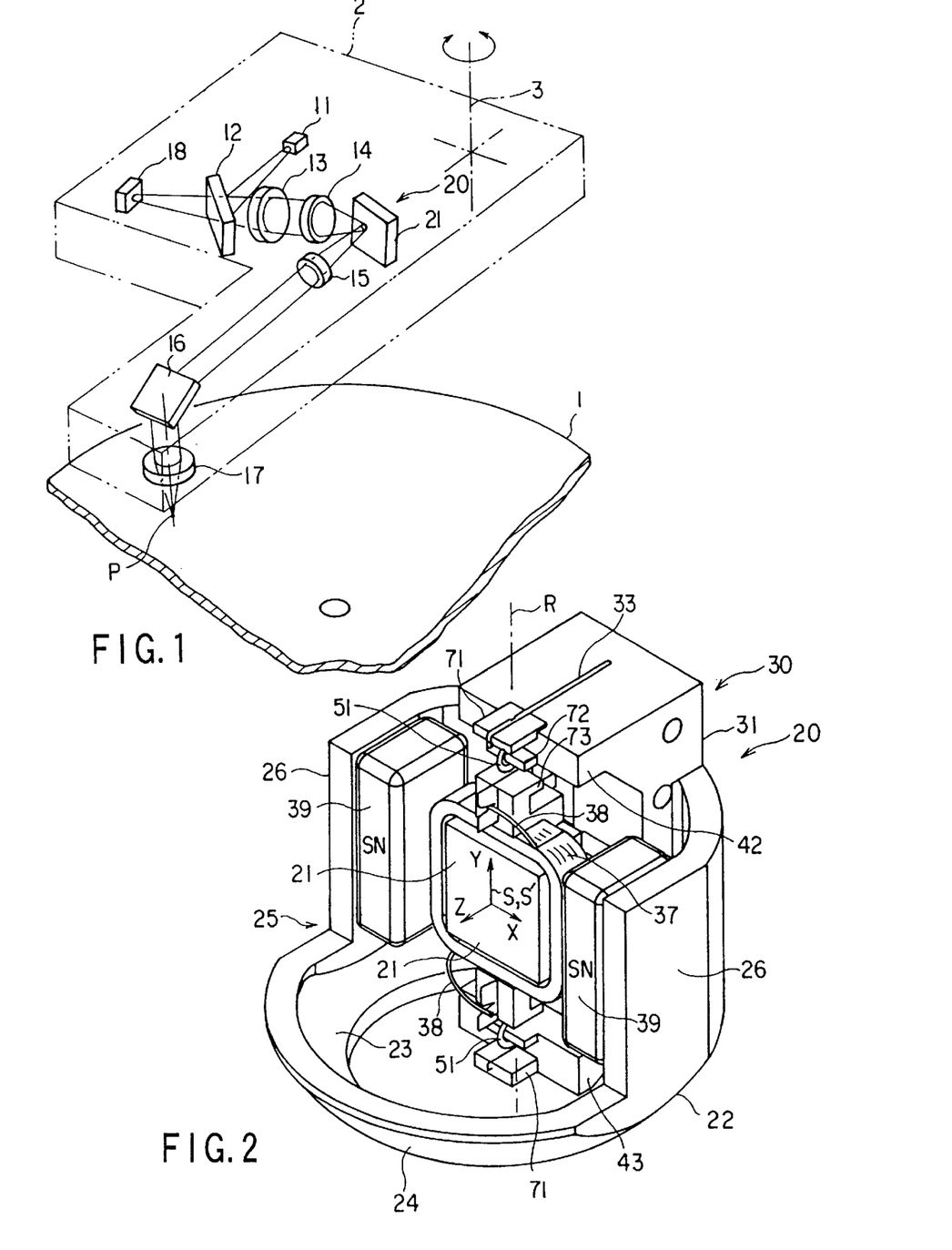
FIG. 1 is a schematic perspective view showing the structure of a light pick-up apparatus according to an embodiment of the present invention.
FIG. 2 is a perspective view of a galvano mirror according to the embodiment, viewed from the front side.

Firstly, the schematic layout of the optical element in the light pick-up device will be explained with reference to FIG. 1. In FIG. 1, the reference 1 denotes a magneto-optical disk, and an arm-like carriage 2 is provided along the recording surface of the magneto-optical disk 1. In the carriage 2, an optical system described later is provided, and a light spot P is focused on the recording surface of the magneto-optical disk 1 by the optical system, to perform writing and reading of data.

The carriage 2 described above is rotated by a drive mechanism not shown about the rotation shaft 3 as a center, and the top end portion thereof is mechanically moved to make coarse access. The optical system is provided with a galvano mirror 20 described later, and the spot P is optically moved to perform fine tracking.

Although no specific structure is shown in the figure, the carriage 2 described above is formed by die-cast molding of magnesium alloy or plastics, and the above optical system is included internally therein. Note that the carriage 2 may be formed by die-cast molding of aluminum alloy or plastics such as polyphenylene sulfide (PPS), liquid crystal plastics (LCP), polyether imide (PEI)or the like, other than die-cast of magnesium alloy described above.

This optical system comprises a laser diode 11 as a light source, and a part of light emitted therefrom is reflected on the surface of a beam splitter 12. The reflection light therefrom enters into a collimator lens 13 and becomes parallel light. Further, the parallel light is converged by a relay lens 14. Also, this optical system is provided with a galvano mirror 20 described later. The light converged by the relay lens 14 is reflected at a position before the focus position thereof by a mirror 21 of the galvano mirror 20, and is changed into parallel light again by a conversion lens 15. The parallel light travels in the arm portion of the carriage 2 along the lengthwise direction thereof, and is reflected by a fixed mirror provided at the top end portion of the arm portion. The reflection light enters into an objective lens 17 and focuses the light spot P described above, on the recording surface of the magneto-optical disk 1.

In addition, a part of returning light from the recording surface of the magneto-optical disk 1 is transmitted through the beam splitter 12 and enters into a photo-detector 18. Further, a signal such as a data reproducing signal, focusing error signal, tracking error signal, or the like is obtained by an output from this photo-detector 18. For example, the focusing error signal and tracking error signal are supplied to a control circuit (not shown) of the light pick-up device. By a control signal from the control circuit, the mirror 21 of the galvano mirror 20 is rotated about the mirror rotation shaft thereby to move the position of the light spot P in the tracking direction so that fine tracking described above is carried out. Also, by the control signal from the control circuit, the relay lens 14 is rotated in its optical axis direction by a drive mechanism not shown thereby to make focusing control of the light spot P on the magneto-optical disk 1.

In the present embodiment, each of the light paths from the laser diode 11 to the fixed mirror and to the photo-detector 18 is arranged in the plane parallel to the rotation plane of the carriage 2.

Figures 3, 4:
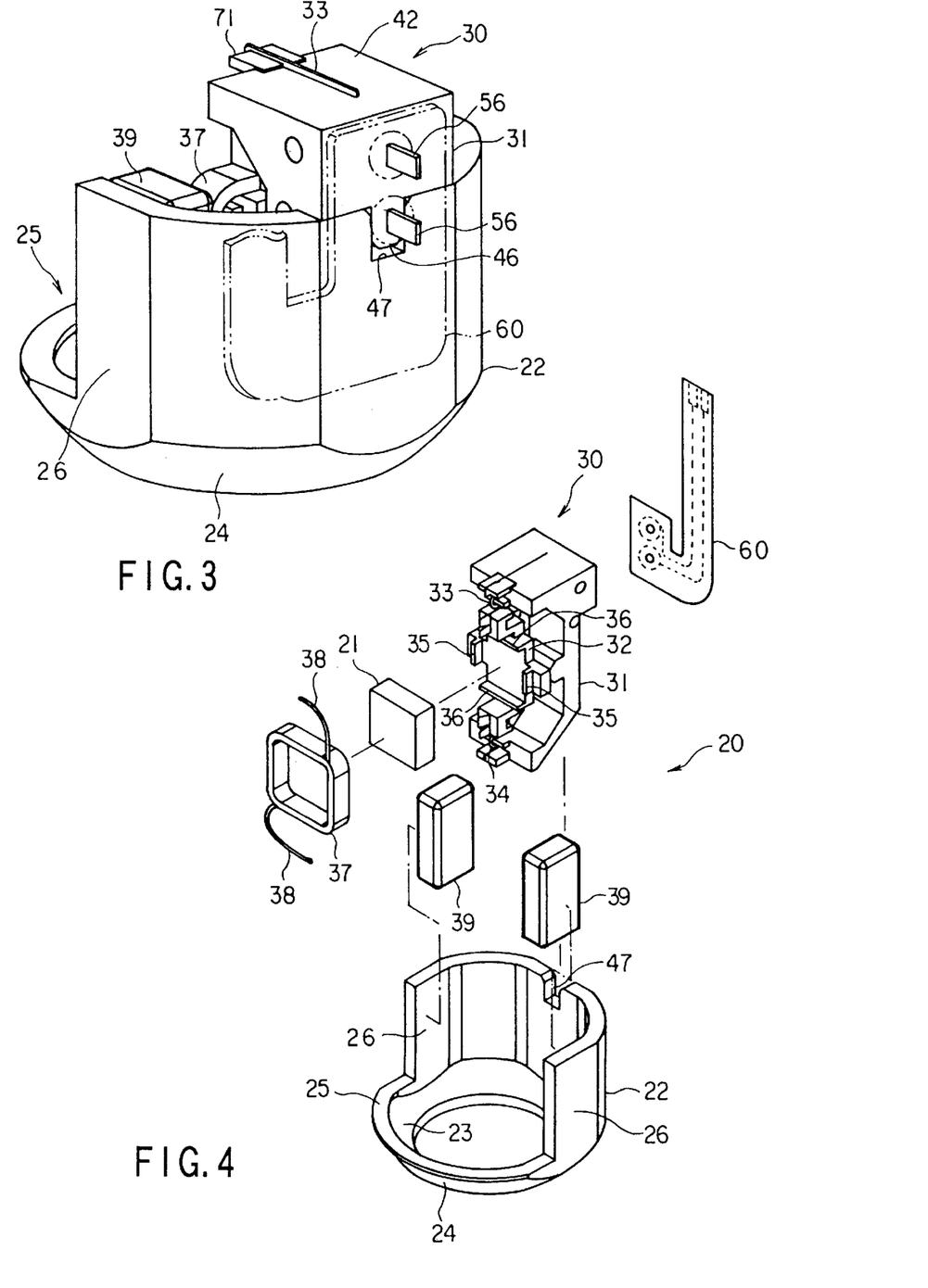
FIG. 3 is a perspective view of the galvano mirror according to the present invention, viewed from the rear side.
FIG. 4 is an exploded perspective view of the galvano mirror according to the embodiment.

Next, explanation will be made of the structure of the galvano mirror 20 used in the light pick-up device of the present embodiment. FIG. 2 is a perspective view of the galvano mirror of this embodiment viewed from the front side. FIG. 3 is a perspective view thereof from the backside. FIG. 4 is an exploded perspective view thereof.

In the drawings, the reference 22 denotes a base member, and this base member 22 is formed by press-molding a steel plate material and has a substantially cylindrical shape having a bottom, as a whole. A hole is formed in the central portion of the bottom wall portion 23 of the base member 22 thereby forming a ring-like shape, and the lower surface of the bottom wall portion 23 is formed to be spherical as a supporting surface 24 for installing and adjusting the galvano mirror. The center of the sphere of the supporting surface 24 corresponds to the position 0 of the light axis of the entering light on the reflection surface of the mirror 21. Among the circumferential walls of the base member 22, the front surface side of the mirror 21 is notched so that a light path opening 25 is formed for passing light.

Figures 10, 11:
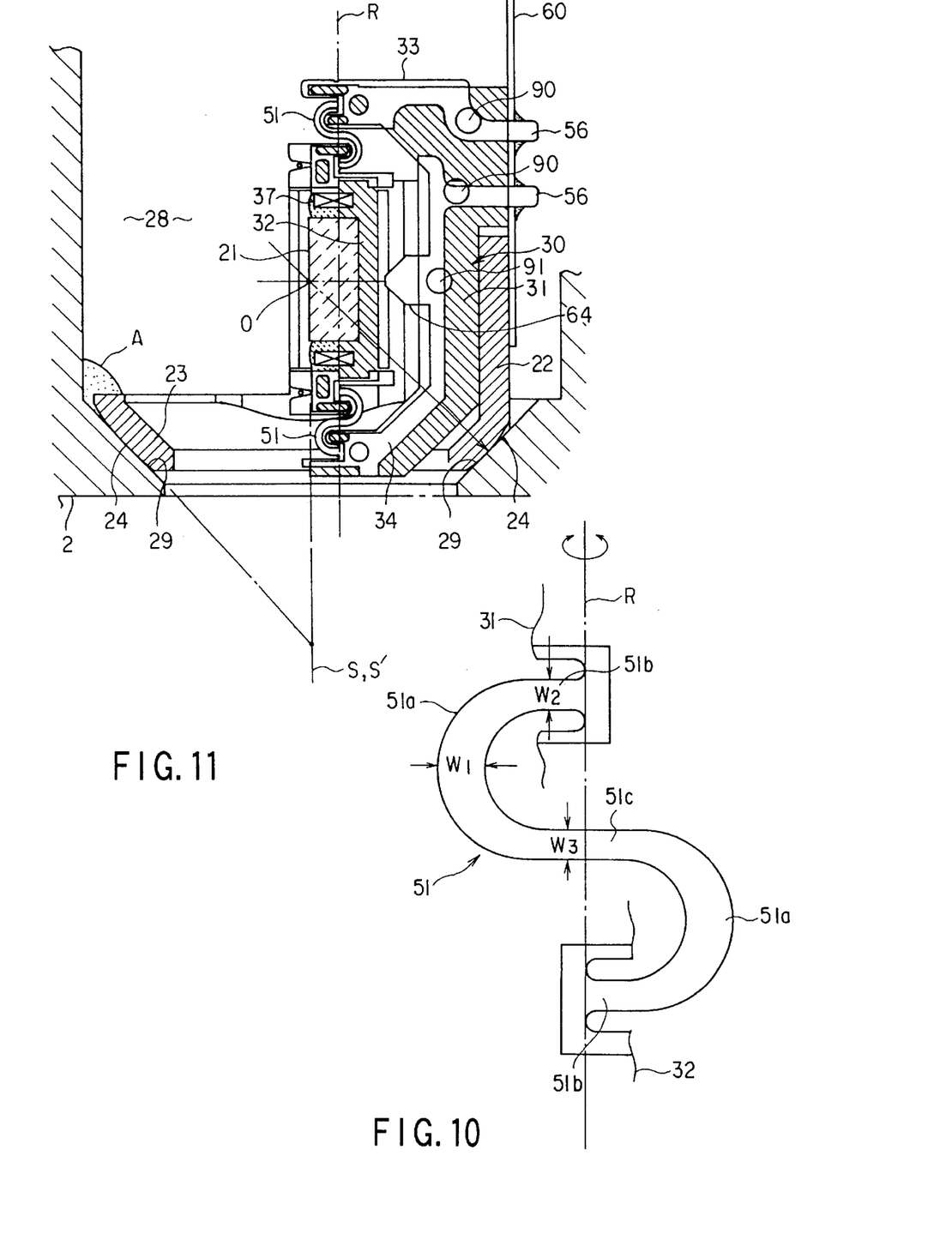
FIG. 10 is a schematic side view of an S-shaped spring portion.
FIG. 11 is a longitudinal sectional view of a galvano mirror container section and the galvano mirror contained therein.
Figure 12:
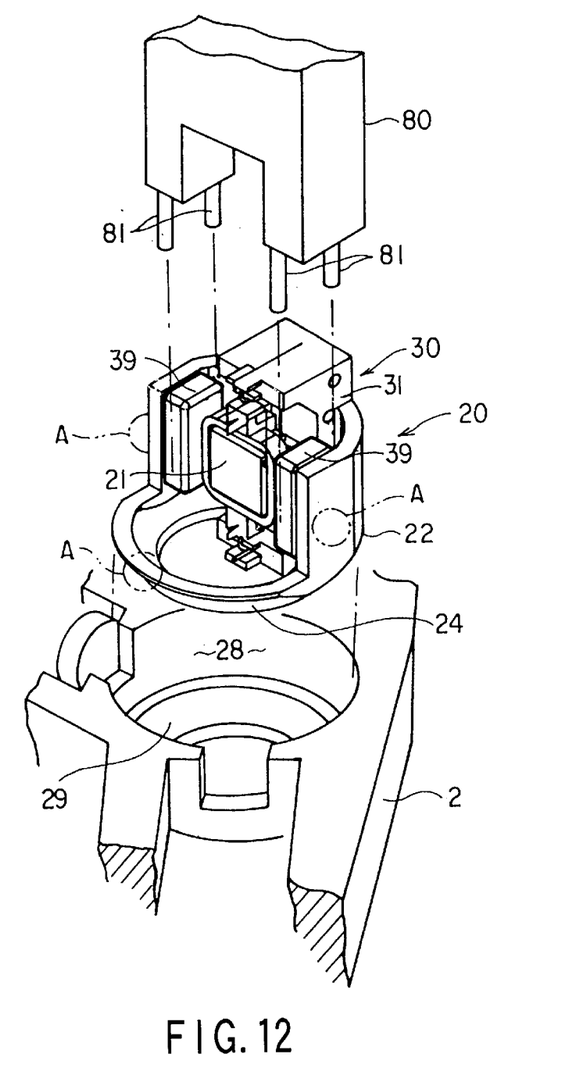
FIG. 12 is an exploded perspective view showing an installation state of the galvano mirror.

The galvano mirror 20 as described above is contained n a galvano mirror container section 28 formed in the carriage 2, as shown in FIGS. 11 and 12. This galvano mirror container section 28 has a shape substantially corresponding to the outer shape of the galvano mirror 20 as described above, i.e., a circular concave portion. The galvano mirror container section 28 is opened in the direction vertical to the plane where the light paths in the carriage 2 are provided, e.g., toward the upside. The opening direction of the galvano container section 28 is also the leaving direction when the carriage 2 is subjected to die-cast molding with a metal mold.

Further, a ring-like bearing seat surface 29 is formed on the bottom portion of the galvano mirror container section 28. The bearing seat surface 29 is integrally formed when the carriage 2 is molded by die-casting, and has a shape like a conical surface. Further, the galvano mirror 20 inserted in the galvano mirror container section 28 is adjusted about its inclination, with the supporting surface 24 at the bottom kept in contact with the bearing seat surface 29, and is fixed at a predetermined inclined position.

The center axis S of the supporting surface 24 of the galvano mirror 20 and the center axis S' of the bearing seat surface 29 are each arranged in parallel with the mirror rotation axis R which is the rotation center axis of the mirror 21. In addition, the center axes S and S' of these supporting surface 24 and the bearing seat surface 29 are included in the reflection surface of the mirror 21 and are arranged so as to pass the position of the optical axis of the entering light on the reflection surface.

Further, a spring assembly 30 is contained in the base member 22. This spring assembly 30 is comprised of a fixing member 31 as a member on the fixed side, which is made of synthetic resin material in a cantilever-like shape, and a movable member 32 as a member on the movable side, which is made of also synthetic resin material and is supported to be rotatable on the front side of the fixed member 31. The movable member 32 is supported to be rotatable about the mirror rotation axis R parallel to the Y axis as shown in FIG. 2 by springs 33 and 34 described later.

Also, a mirror 21 is attached to the front surface of the movable member 32, and a substantially rectangular movable coil 37 is equipped so as to surround the mirror 21. A movable section is formed by the movable member 32, mirror 31, and the movable coil 37. The light paths of the entering light and reflection light which enter into the mirror 21 are arranged in a plane which includes the X-axis and Y-axis in FIG. 2. The mirror rotation axis R described above is parallel to the Y-axis as described above and passes the gravity center point of the entire movable section consisting of the movable member 32, mirror 21, and movable coil 37. The mirror rotation axis R corresponds to the main axis of inertia of the movable section.

Note that total four projections consisting of a pair of left and right positioning projecting portions 35 and a pair of upper and lower positioning projecting portions 36 are integrally projected on the front surface of the movable member 32. Further, the left and right side surfaces and the upper and lower surfaces of the mirror 21 are fitted into the inner surfaces of the positioning projecting portions 35 and 36, and the mirror 21 is positioned at a predetermined position on the front surface of the movable member 32. In addition, the movable coil 37 has left, right, upper and lower inner circumferential surfaces fitted into the outer surfaces of the positioning projecting portions 35 and 36, and the movable coil 37 is positioned at a predetermined position. Therefore, the positioning projecting portions 35 and 36 are interposed between the outer circumference of the mirror 21 and the inner circumference of the movable coil 37, and a predetermined clearance is formed therebetween.

Further, the movable member 32, mirror 21, and movable coil 37 integrally adhere to one another by an adhesive material filled in the clearance. Accordingly, the movable section consisting of these components has a rectangular block-like shape as a whole and those component are also integrally joined to one another by an adhesive material. Therefore, the oscillation frequency inherent to the movable section is very high, and resonance generated when the movable section rotates is securely prevented.

Note that the fixed member 31 and the movable member 32 are formed of a non-conductive synthetic resin material reinforced by glass fibers, such as liquid crystal plastics (LCP), polyphenylene sulfide (PPS), polyether imide (PEI), polycarbonate (PC). In addition, the mirror 21 described above is obtained by forming a reflection film having a high reflection ratio, on a flat glass substrate. The movable coil 37 is obtained by winding a lead wire having a diameter of 0.05 mm into four layers, and lead lines 38 are respectively lead from upper and lower portions thereof. Note that the power supply structure for the movable coil 37 will be described later.

In addition, the plan shape of the spring assembly 30 described above is substantially rectangular as described above, and this spring assembly 30 is inserted in the cylindrical base member 22, thereby forming spaces on both sides of the spring assembly 30. Note that an engaging projecting portion 46 is formed on the back surface of the fixed member 31 of the spring assembly 30, as shown in FIG. 3. In correspondence with the engaging projecting portion 46 described above, an engaging concave portion 47 is formed at the upper edge portion of the circumferential wall portion of the base member 22 on the back surface side thereof. Further, the engaging projecting portion 46 is engaged in the engaging concave portion 47, and the assembly is thereby positioned and engaged in the base member 22.

In the spaces on both sides of the spring assembly 30, fixed permanent magnets 39 each having a substantially rectangular block-like shape are respectively contained with their different poles opposed to each other. Those portions of the circumferential walls of the base member 32 that contain the permanent magnets 39 are formed on the flat surface portions 26 and are thus constructed so as to contain stably the permanent magnets 39.

The plan shape of the base member 22 is substantially circular, and the plan shape of each of the spring assembly 30 and the permanent magnets 39 is rectangular. Therefore, since these components are contained and engaged in the base member 22, clearances are respectively formed on the rear side of the permanent magnets 39. These clearances are used as clearances where a positioning pin of a fitting tool is inserted when the galvano mirror 20 is adjusted and attached as will be described later.

Figure 5:
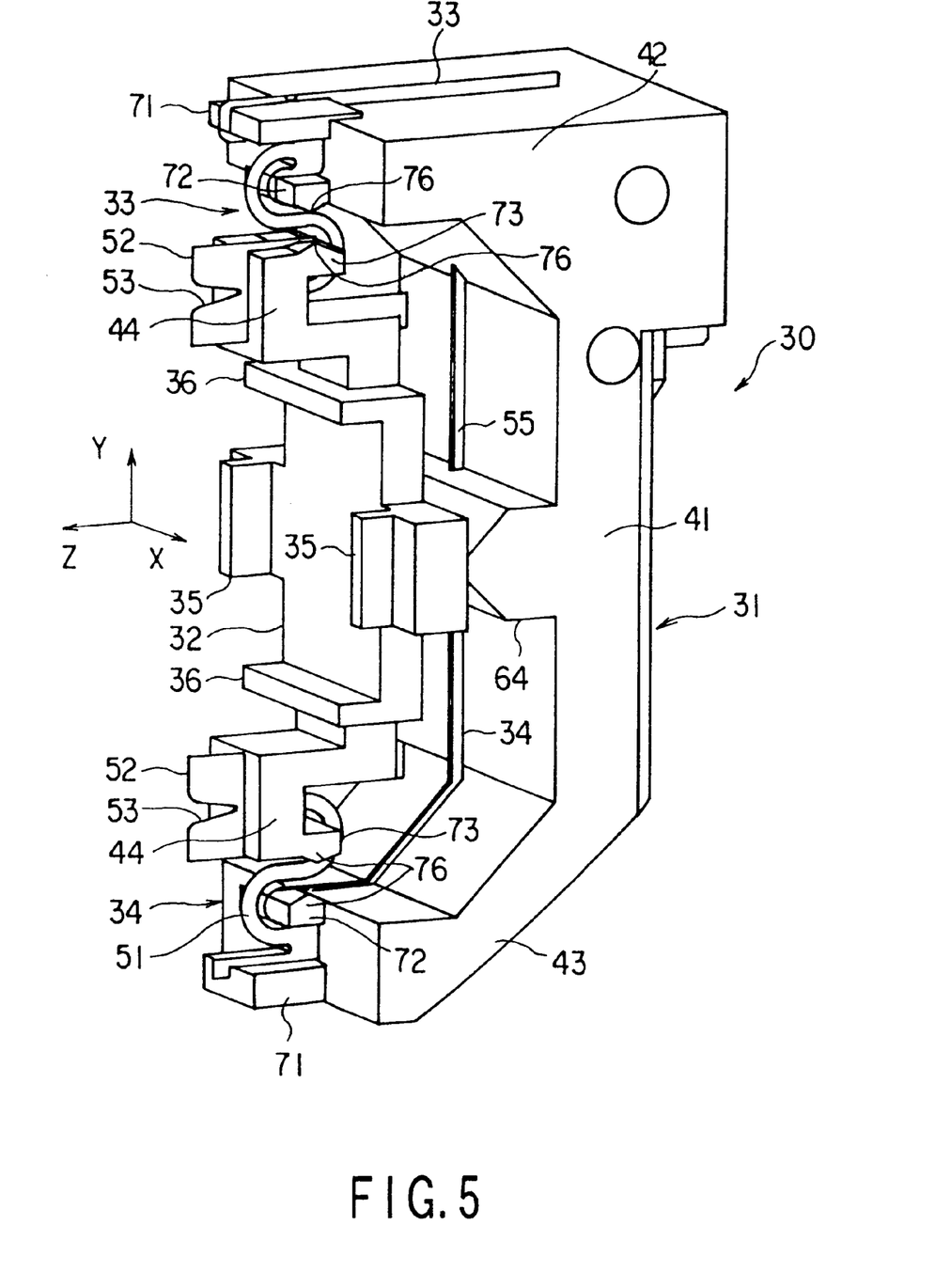
FIG. 5 is a perspective view of a spring assembly of the galvano mirror according to the embodiment.

Next, explanation will be made of an apparatus for supporting the spring assembly 30 and the movable member 32. FIG. 5 is a perspective view of the spring assembly 30. The fixed member 31 described above has a beam-like beam portion 41 and arm portions 42 and 43 projecting from the upper and lower end portions of the beam portion 41. Spring attachment portions 44 are formed to be projected integrally from the upper and lower end portions of the movable member 32, respectively. The arm portion 42 and 43 and the spring attachment portions 44 are joined to be rotatable about the mirror rotation axis R described above. The joint structure of the springs 33, 34, fixed member 31, and movable member 32 is constructed as follows.

Figure 6:
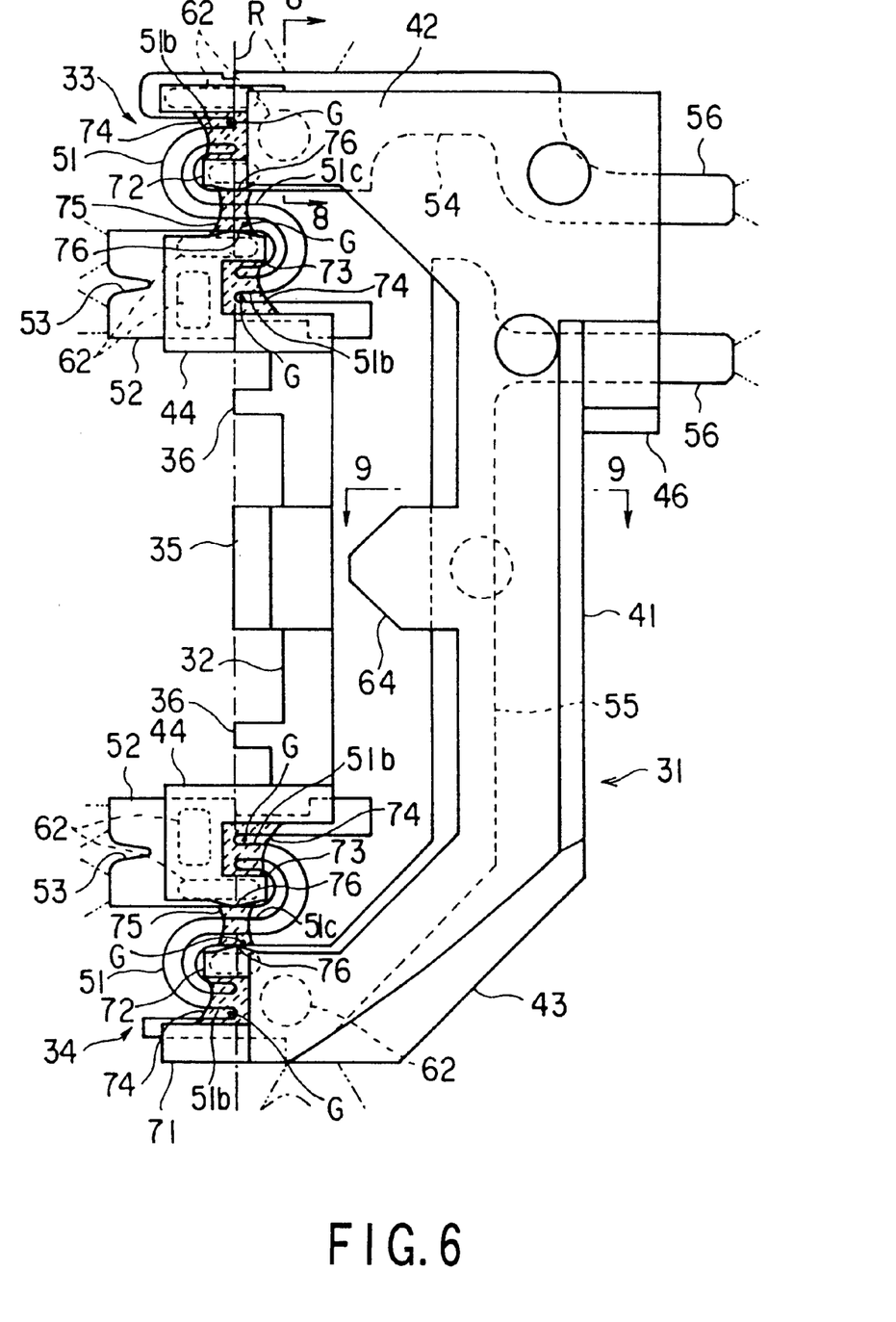
FIG. 6 is a schematic side view of the spring assembly of the galvano mirror according to the embodiment.
Figure 7:
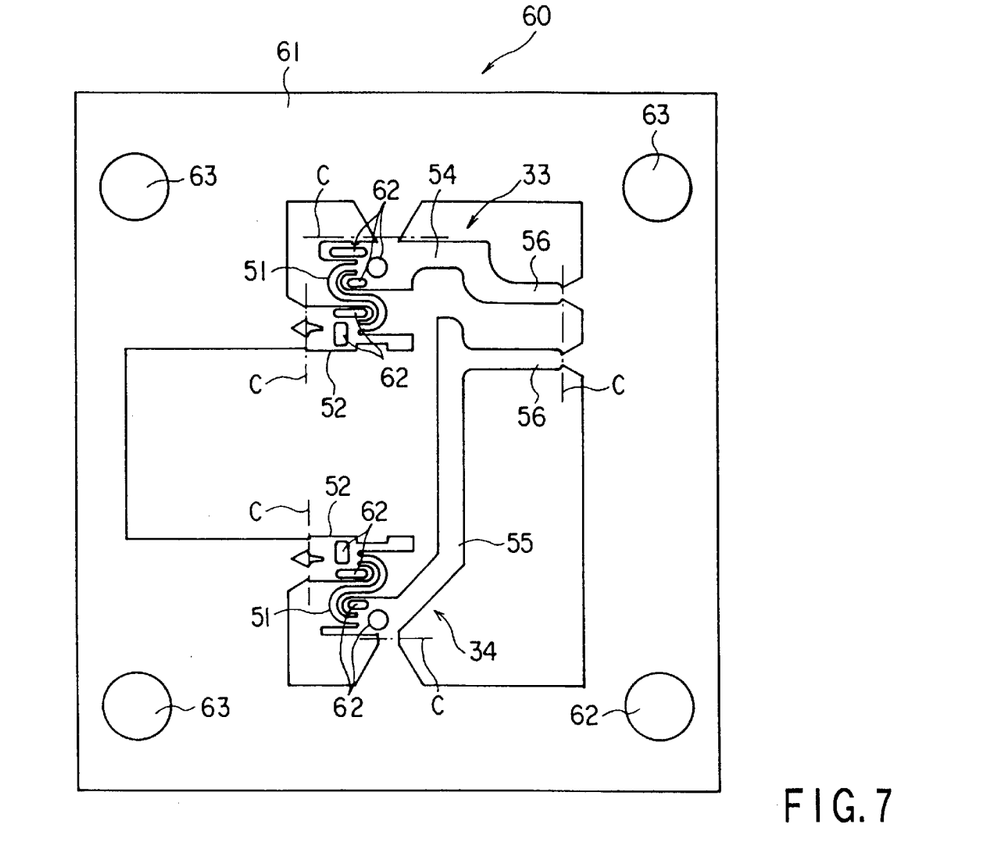
FIG. 7 is a plan view of a blank material of a spring according to the embodiment.

FIG. 6 shows the shapes of the springs 33 and 34 and the layout relationship between the fixed member 31 and the movable member 32. FIG. 7 shows a state of a rapped blank material before the springs 33 and 34 are incorporated in the fixed member 31 and movable member 32. These springs 33 and 34 serve as members for rotatably supporting the movable member 32, reinforcement members for reinforcing the fixed member 31 and the like, and conductive members for supplying power to the movable coil 37 described above.

These springs 33 and 34 are obtained by processing thin plate materials of, for example, beryllium-copper alloy having a thickness of 0.03 mm into predetermined shapes by etching or the like, and gold plating is performed on the surfaces thereof to improve the corrosion resistant characteristic and soldering characteristic. Further, these springs 33 and 34 each include, for example, an S-shaped spring portion 51 curved in a S-shape, a terminal portion 52 formed to be continuous to an end portion of the S-shaped spring portion 51 and also serving as an attachment portion to the movable member 32, reinforcement conductive portions 54 and 55 formed to be continuous to the other end portion of the S-shaped spring portion 51, and a terminal portion 56 formed at the top end portions of the reinforcement conductive portions 54 and 55. V-shaped engaging notches 53 engaged with a lead line 38 of the movable coil 37 are respectively formed in the top end portions of the terminal portions 52 described above. The reinforcement conductive portion 55 of the lower spring 34 is formed to be substantially L-shaped.

The springs 33 and 34 are arranged in parallel with the Y-Z plane in FIGS. 2 and 5, and the terminal portion 52 and the reinforcement conductive portions 54 and 55 are embedded to be integral with the center surface and the symmetrical surface of the fixed member 31 and the movable member 32. The reinforcement conductive member 54 and 55 are metal plate materials and have high rigidity against bending and shearing deformation in the surface direction. Therefore, since these materials are embedded integrally in the beam portion 41 and the arm portions 42 and 43 in the fixed member 31, the rigidity of these parts is increased, thereby preventing deformation due to loads and deformation due to thermal expansion according to temperature changes, so that the precision of the spring assembly 31 is increased. In addition, since the terminal portion and the reinforcement conductive portions 54 and 55 are embedded in the center planes of the fixed member 31 and the movable members 32, the spring assembly 30 is laterally symmetrical with respect to the center plane, so that irregular deformation is more efficiently prevented and the precision is more improved.

The terminal portion 52 of the upper spring 33 is integrally embedded in the spring attachment portion 44 on the upper side of the movable member 32, and the top end portion of the terminal portion 52 projects from the top end surface of the spring attachment portion 44. Further, one of the lead lines 38 of the movable coil 37 is engaged with the engaging notch 53 at the top end portion and further joined thereto by soldering. In addition, the reinforcement conductive portion 54 is integrally embedded in the upper arm portion 42 of the fixed member 31. Further, the terminal portion 56 at the top end of the reinforcement conductive portion 54 projects through the back surface of the fixed member 31, as shown in FIG. 3. Further, as shown in FIGS. 3 and 11, a terminal portion of a printed wiring board 60 is soldered to the terminal portion 54. Therefore, power is supplied to the movable coil 37 through the printed wiring board 60, the reinforcement conductive portion 54 of the spring 33, the S-shaped spring portion 51, the terminal portion 52, and the lead line 38.

In addition, as for the lower spring 34, the terminal portion 52 thereof is embedded in the spring attachment portion 44 on the lower side of the movable member 32, and the engaging notch 53 is engaged with and soldered to the other lead line 38 of the movable coil 37. In addition, the L-shaped reinforcement conductive portion 55 of this spring 34 is integrally embedded continuously in the lower arm portion 43 and beam portion 41 of the fixed member 31. Further, the terminal 56 at the top end of the reinforcement conductive portion 55 projects through the back surface portion of the fixed member 31 and is soldered to the other terminal portion of the printed wiring board 60, in a similar manner as described above. Also, in a similar manner as described above, power is supplied to the movable coil 37 through these components.

This kind of spring assembly 30 is assembled in the following manner. Firstly, a thin plate material of beryllium-copper alloy or the like as described above is processed by etching to manufacture a blank material 60 of a spring as shown in FIG. 7. This blank material 60 has a frame-like frame portion 61, and springs 33 and 34 as described above are integrally in the frame portion 61, with a predetermined layout relationship. Note that these springs 33 and 34 are continuous to the frame portion 61 along the portion of a cut plan line C along which cutting is carried out after assemble. Also, for example, at four corners of the frame portion 61, positioning holes 63 are respectively formed for positioning.

Further, this blank material 60 is interposed between a pair of metal molds (not shown) and these molds are matched each other. A resin material is injected into the cavity of these molds to form the fixed member 31 and movable member 32. At the same time, the portion of the springs 33 and 34 are integrally embedded in the center plane as a matching interface of the molds of the fixed member 31 and the movable member 32.

Figures 8, 9:
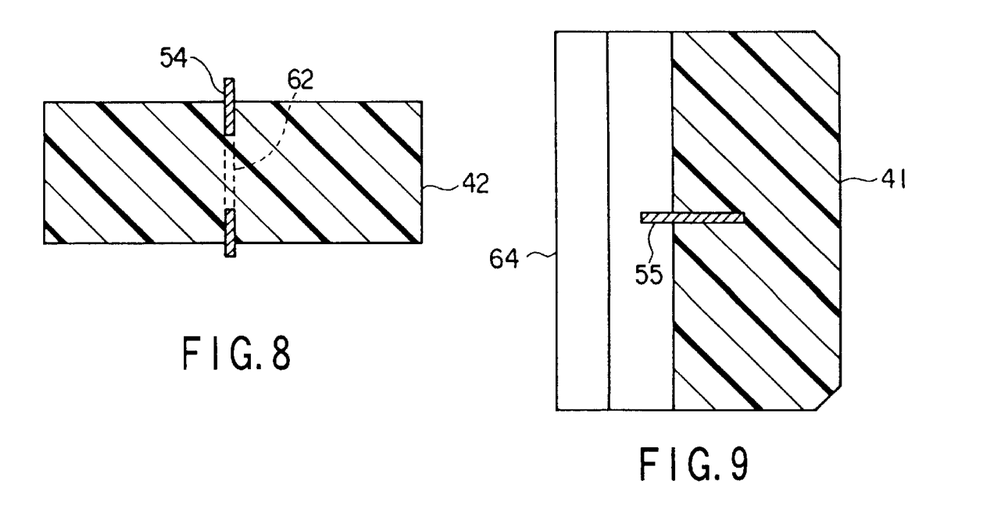
FIG. 8 is a cross-sectional view cut along a line 8—8 in FIG. 6.
FIG. 9 is a cross-sectional view cut along a line 9—9 in FIG. 6.

Note that the adhesive force between the resin material and the springs 33 and 34 is so small that the embedded springs 33 and 34 are not integrated and the fixed member 31 and the movable member 32 sometimes crack into the left and right sides at these portions. To prevent this, through holes 62 are formed in appropriate portions of the springs 33 and 34, and for example, as shown in FIG. 8, an injected resin material is filled into these holes so that the fixed member 31 and the left and right part of the movable members 32 are joined together and the springs 33 and 34 are integrated.

In addition, when injecting the resin material into the cavity of the metal molds, respective parts of the springs 33 and 34 are deformed in the cavity by the injection pressure thereof, and the respective parts of the springs 33 and 34 are shifted from the center or deformed, in some cases. To prevent this drawback, the top end portion of the terminal portion 52, the appropriated portions of the springs 33 and 34, such as, for example, the edge portions of the reinforcement conductive portions 54 and 55, and the terminal portion 56 are clamped and pressed between the metal molds, thereby to prevent these portions from being shifted or deformed in the cavity. Accordingly, the portions clamped and pressed between the metal molds project from the surfaces of the fixed member 31 and the movable member 32, as shown in FIGS. 8 and 9.

Note that the reinforcement conductive portion 55 is embedded substantially over the whole length of the beam portion 41 of the fixed member 31, and the edge portion thereof projects substantially over the whole length of the beam portion 41. Therefore, at the embedded portion where the reinforcement conductive portion 55 is embedded, the beam portion 41 is divided into left and right parts, and the strength and rigidity thereof are deteriorated. To prevent this drawback, through holes as described above are formed in the reinforcement conductive portion 55 and the left and right parts of the beam portion may be joined by the resin material filled in the through holes. However, if these through holes are formed, the strength and rigidity of the reinforcement conductive portion 55 are deteriorated. Therefore, at the center portion of the beam portion 41, a connection rib portion 64 is integrally projected in the direction crossing the beam portion. This connection rib portion 64 connects the left and right parts of the beam 41 together over the projecting edge portion of the reinforcement conductive portion 55. Therefore, the left and right parts of the beam 41 can be connected without forming through holes in the reinforcement conductive portion 55.

The connection rib portion 64 is opposed to the back surface of the movable member 32 and also serves as a stopper which restricts the maximum rotation angle of the movable member 32.

Further, after these springs 33 and 34 are integrally embedded in the fixed member 31 and the movable member 32, the portion of the cut plan line C is cut, and the springs 33 and 34 are separated from the frame portion 61. The spring assembly 30 is thus completed.

Next, the S-shaped spring portions 51 will be explained. These S-shaped spring portions 51 are arranged in parallel with the Y-Z plane in FIGS. 2 and 5 as described above, and support the movable member 32 to be rotatable about the mirror rotation axis R parallel to the Y-axis in FIGS. 2 and 5. The S-shaped spring portion 51 also function as a support member to prevent the movable member 32 as much as possible in directions other than that axis.

FIG. 10 shows an enlarged view of the S-shaped spring portion 51, and a pair of substantially semicircular curve portions 51a, end portions 51b thereof, and a substantially linear portion 51c which connects the other end portions of the curve portions 51a are integrally formed. Further, the end portions 51b described above are fixed on the side of fixed member 31 and on the side of the movable member 32.

The S-shaped spring portions 51 utilizes the deformation characteristic of a thin plate to achieve the function as a support member as described above. In general, a thin plate material has large dimensions in the surface direction, relative to the thickness of the plate. Therefore, a thin plate material has the smallest rigidity with respect to simple bending deformation in the direction perpendicular to the surface direction, certainly high rigidity with respect to twisting deformation, and has the highest rigidity with respect to bending deformation or shearing deformation along both directions. When the movable member 32 is rotated about the mirror rotation axis R in relation to the fixed member 31, simple bending deformation in the direction perpendicular to the surface direction is caused in the portion close to the mirror rotation axis R which means the base end portions of the end portions Sib and the central portion of the linear portion 51c of the S-shaped spring portion 51 although twisting deformation is caused at the portion apart from the axis R so that the twisting deformation becomes larger as the portions are more apart from the axis R. Consequently, simple bending deformation occurs, concentrating at the portions close to the axis R, and the deformation amount is small at the portions apart from the axis R. Besides, the entire deformation of the S-shaped spring portion 51 is symmetrical to the axis R as the center. Therefore, the S-shaped spring portion 51 supports the movable member 32 so as to rotate about the mirror rotation axis R, so that the elastic force caused by the rotation about the mirror rotation axis is small.

Meanwhile, when the movable member 32 is moved to be inclined about the Y-axis direction, Z-axis direction, and X-axis direction, bending deformation and shearing deformation in the surface direction occur in the S-shaped spring portion 51. The S-shaped spring portion 51 has high rigidity with respect to bending deformation and shearing deformation in the surface direction, as described above, and therefore, the supporting rigidity of the movable member 32 is high with respect to these directions. In particular, although movement in the Z-axis direction and inclination about the X-axis cause optical errors such as a displacement of the light focus point of light reflected by the mirror 21 attached to the movable member 32 and an inclination of the optical axis, the supporting rigidity in these directions is high as described above so that these optical errors can be excluded effectively.

When the movable member 32 is moved in the direction of the X-axis and when it is inclined about the Z-axis, twisting deformation occurs at the end portions 51b and the linear portion 51c of the S-shaped spring portion 51 and simple deformation occurs at the center portions of the bending portions 51a, so that the rigidity is lowered relatively. The movement in these directions is simply a movement of the mirror 21 in the direction parallel to the reflection surface thereof and does not cause a substantial displacement of the reflection surface. Therefore, no optical error occurs.

Further, the S-shaped spring portion 51 is formed in a shape as described below in order that movement in the Z-axis direction, inclination about the Z-axis which are factors of an optical error are reduced as much as possible, i.e., that the bending deformation and shearing deformation of the S-shaped spring 51 in the surface direction are reduced as much as possible. As shown in FIG. 10, the S-shaped spring portion 51 is arranged such that the widths $W_2$ and $W_3$ of the end portions 51b and the linear portion 51c are narrow while the width $W_1$ of the curve portions 51a, which forms a folded part folded on the way, is wide. For example, in this embodiment, the width $W_2$ and $W_3$ of the end portions 51b and the linear portion 51c are each set to 0.08 mm and the width $W_1$ of the curve portions 51a is set to 0.16 mm.

To increase the rigidity of the S-shaped spring portion 51 against bending deformation and shearing deformation, the widths of respective portions of the S-shaped spring portion 51 may be widened. However, if the widths are uniformly widened, the rigidity of the end portions 51b and the linear portion 51c against simple bending in the direction perpendicular to the surface direction is increased so that the rigidity against deformation about the mirror rotation axis R is increased. However, if the width W1 of the curve portion 51a is widened as described above, the rigidity of the end portions 51b and the linear portion 51c against simple bending in the direction perpendicular to the surface direction is substantially unchanged but the rigidity of the curve portions 51a against bending deformation and shearing deformation in the surface direction thereof is increased. Meanwhile, when deformation about the mirror rotation axis R occur as described above, the end portions 51b and the linear portion 51c close to the mirror rotation axis R are mainly curved and deformed while deformation is small at the curve portion 51a positioned apart from the axis R. Accordingly, the increase of the rigidity about the mirror rotation axis R is slight in this case.

Since the S-shaped spring portion 51 described above functions as a member which ensures rotatably supporting about the mirror rotation axis R, it is preferred for the characteristic of this portion that the rigidity $G_Z$ against deformation in the other direction which is the Z-axis direction in FIG. 5 is larger than the rigidity $G_R$ against deformation about the axis R, i.e., $G_Z/G_R$ is as large as possible.

Next, explanation will be made of results of a test conducted to confirm the result as described above. In this case, since the above S-shaped spring portion 51 has a small size, it is difficult and inaccurate to measure directly the rigidity in the respective directions of the S-shaped spring portion 51. Taking into consideration this condition, the ratio of rigidity of $G_Z/G_R$ described above was indirectly measured in the following manner.

Firstly, as a comparative example, a spring having a plate thickness of 0.03 mm and a uniform width of 0.08 mm over the entire S-shaped spring portion was prepared, and a spring according to the embodiment as described above in which the end portions 51b and the linear portion 51c each had a width of 0.08 mm and the width W1 of the curve portion 51a was 0.16 mm was prepared. These springs were integrated with same fixed members 31 and same movable members 32, and thus, spring assembles 30 were prepared.

Further, natural frequencies of the movable member 32 in respective directions were measured. First, with respect to the comparative example having a uniform width, the natural frequency $f_R$ of the movable member 32 about the mirror rotation axis R and the natural frequency $f_Z$ of the movable member 32 in the Z-axis direction were measured, and as a result, $f_R$=128 Hz and $f_Z$=718 Hz were obtained. Meanwhile, the natural frequencies were measured likewise with respect to the spring according to the embodiment, and as a result, $f_R$=159 Hz and $f_Z$=1414 Hz were obtained. Further, as a result of calculating the ratios of them, the comparative example having a uniform width had $f_Z/f_R$ of 5.6 while the spring according to the present embodiment had $f_Z/f_R$ of 8.9. Further, since the ratio of rigidity of the S-shaped spring portion is $(f_Z/f_R)^2$, the comparative example described above had $(f_Z/f_R)^2$ of about 31, i.e., the ratio $G_Z/G_R$ of the rigidity about the mirror rotation axis and the rigidity in the Z-axis direction was about 31. In contrast, the spring according to the present embodiment had $G_Z/G_R$ of about 79. Accordingly, the $G_Z/G_R$ of the spring according to the present embodiment was as about 2.6 times high as that of the comparative example. Therefore, in the spring according to the present embodiment, the rigidity $G_Z$ in the Z-axis direction is about 2.6 higher than the comparative example if the rigidity $G_R$ about the mirror rotation axis R is set to be equal to that of the comparative example. That is, for example, the amount by which the movable portion 32 is moved due to resonance or oscillation is 1/2.6, i.e., the displacement of light reflected by the mirror 21 is 1/2.6. It is thus possible to obtain a galvano mirror with high accuracy and a stable tracking characteristics.

Also, as a form of the support member described above, the S-shaped spring 51 as described above is used. As for the spring as a support member for the galvano mirror 20, the effective length of the spring is preferable long in order to reduce the maximum stress which occurs at the support member thereby to improve the reliability of the support member. However, if it is elongated in the support member mirror rotation axis direction, the size of the galvano mirror 20 is very large and hinders downsizing of the apparatus. Therefore, in the present embodiment, the spring as a support member is formed in a S-shaped and the spring length between the end portions 51b and 51b of the spring is elongated while the linear distance between the two end portions 51b and 51b.

Further, in the present embodiment, installation of the end portion 51b onto the fixed member 31 and installation of the end portion 51b to the movable member 32 are situated in the Z-direction as a direction vertical to the direction of the mirror rotation axis R. Therefore, the dimension in the mirror rotation axis R direction can be arranged to be very small including the attachment portion for the S-shaped spring 51 as a support member. Therefore, the reliability can be improved by reducing the dimensions of the galvano mirror 20 in the mirror rotation axis R direction to reduce the power consumption and to reduce the maximum stress generated at the support member.

In addition, the movable member 32 is supported to be rotatable about the mirror rotation axis R by deformation of the S-shaped spring portions 51 of the springs 33 and 34. Since the S-shaped spring portion 51 has a predetermined spring constant with respect to deformation about the mirror rotation axis R, the movable member 32 oscillates about the mirror rotation axis R. Further, to damp such oscillation of the movable member 32, there is provided a damping mechanism as follows.

That is, as shown in FIGS. 5 to 6, upper and lower pairs of projecting portions 71 and 72 are respectively provided at the top end portions of the arm portions 42 and 43 of the fixed member 31, such that one end portion 51b of each spring portion 51 of the springs 33 and 34 is surrounded thereby. In addition, the spring attachment portions 44 of the movable member 32 are respectively provided with projecting portions 73, and the spring attachment portions 44 are formed like a U-shape such that the other end portions 51b of the S-shaped spring portions 51 are surrounded thereby. In addition, by the projecting portions 72 and 73 described above, the linear portion 51c of the S-shaped spring portion 51 is surrounded thereby.

Further, the concave portion formed between the projecting portions 71 and 72 and the clearance between the projecting portions 72 and 73 are filled with damping materials 74 and 75, respectively. The end portions 51b of the S-shaped spring portions 51 are embedded in the damping materials 74, and the linear portion 51c of the S-shaped spring portion 51 is embedded in the damping material 75 described above. These damping materials 74 and 75 are, for example, obtained in a manner in which predetermined amounts of thermosetting silicon gel material having fluidity in an unhardened liquid state area injected and held in the concave portions and the clearance, and the spring assembly 30 is thereafter heated in an oven, for example, at 70° C. for 30 minutes, so that the unhardened gel material is hardened to form silicon gel material having a predetermined viscosity.

Accordingly, if the movable member 32 is rotated about the mirror rotation axis R, the end portions 51b and the linear portion 51c of the S-shaped spring portion 51 are deformed in the damping materials 74 and 75 thereby generating a predetermined damping force due to the viscosity resistance, so that the oscillation of the movable member 32 is damped.

When the unhardened damping materials 74 and 75 are injected and held, cohesion is effected such that the free surfaces are minimized by the surface tension. Accordingly, the liquid lump of the unhardened damping material 74 is held at a deep portion in the concave portion formed between a pair of projecting portions 71 and 72 and is held at a predetermined position with the end portion 51b embedded at the center portion. In addition, the liquid lump of the unhardened damping material 75 is held between the projecting portions 72 and 73 and is held such that the linear portion 51c of the S-shaped spring portion 51 is embedded in the center thereof.

The clearance formed between two surfaces of a pair of projecting portions 71 and 72 opposed to each other is formed as a damping material maintaining gap G for holding the damping material 74 as described above. In this case, since the damping material holding gap G is formed between a pair of projecting portions 71 and 72 formed on the fixed member 31, the damping material holding gap G can be formed in an arbitrary shape. Therefore, for example, as in the present embodiment, the damping holding gap G can be formed as a U-shaped concave portion having a back wall portion and the injected unhardened damping material can be directly held securely at a deep portion as described above, so that the damping material 74 can be securely held at a precise position. Note that the damping material holding gap G formed by the projecting portion 73 of the spring attachment portion 44 of the movable member 32 is the same as above.

In addition, a damping material holding gap G is also formed between the projecting portions 72 and 73, e.g., between these two opposed surfaces. In this case, these two surfaces are relatively moved and the S-shaped spring portion 51 is deformed, by rotation of the movable member 32. Therefore, the damping material 75 applies a damping force to both of the surfaces so that a much larger damping force can be obtained.

However, if the surfaces of the projecting portions 72 and 73 opposed to each other are parallel planes, the cross-sectional shape of the linear portion 51c is constant in the Z-axis direction and the free surface thereof does not change even when the liquid lump of the damping materials 75 is moved in the lateral direction in FIG. 6, i.e., in the Z-direction in FIG. 5. Therefore, the liquid lump of the damping material 75 is movable to an arbitrary position in the Z-direction, and the holding position thereof is not constant. To prevent this drawback, in the present embodiment, convex portions 76, each of which continues in the X-axis direction and has a convex cross-section, are formed respectively on the surfaces of the projecting portions 72 and 73 which are opposed to each other. At the portion where these convex portions 76 are opposed to each other, the width of the damping material holding gap G is narrowed and a narrow portion N is thus formed. Accordingly, when the liquid lump of the damping material 75 moves in the Z-axis direction, a difference appears between the areas of the free surfaces in both sides, and the liquid lump moves to a position where the surface tensions of the free surfaces in both sides are balanced. The liquid lump is held stably at this portion, i.e., at the narrow portion N. Therefore, it is possible to accurately hold the damping material 75 at a predetermined position.

Note that as a damping materials 74 and 75, it is possible to use arbitrary material having a damping characteristic, such as a ultraviolet-hardening silicon gel, acrylic gel, butyl rubber liquidized by a solvent, silicon oil, or the like, other the materials described above.

Next, explanation will be made of operation of an installation apparatus for attaching the galvano mirror 20 constructed as described above into the galvano mirror container section 28 of the carriage 2 and for installing the mirror at a predetermined position by adjusting the inclination thereof or the like, with reference to FIGS. 11 and 12.

Firstly, as described above, the spherical support surface 24 formed on the bottom surface of the base 22 of the galvano mirror 20 has a center axis S which is parallel to the mirror rotation axis R and is included in the reflection surface of the mirror 21. In addition, the center point of the spherical surface of the support surface 24 corresponds to the position O of the optical axis of the entering light on the reflection surface of the mirror 21. Also, the bearing seat surface 29 in form of a conical surface formed at the bottom portion of the galvano mirror container portion 28 of the carriage 2 has a center axis S', which is parallel to the mirror rotation axis R, is included in the reflection surface of the mirror 21, and passes through the position O of the optical axis of the entering light on the reflection surface of the mirror 21.

Further, as shown in FIG. 12, the galvano mirror 20 is held by a fitting tool 80. This fitting tool 80 has a lower end portion having an inverted U-shape, and for example, four positioning pins 81 are projected from the load bearing portions of the tool. In addition, an electromagnet not shown is included in the fitting tool 80.

This kind of fitting tool 80 is engaged closely with the galvano mirror 20 from upside, and the electromagnet is excited thereby to magnetically attach and hold the galvano mirror 20. In this case, the positioning pins 81 are inserted in the gaps formed in the rear side of the permanent magnets 39 and in the front side thereof, and the front and rear side of the permanent magnets are clamped and held between the positioning pins 81. In this manner, the galvano mirror 20 is held positioned at a predetermined position with respect to the fitting tool 80.

Next, galvano mirror held by the fitting tool 80 is inserted into the galvano mirror container portion 28 from an upper end opening portion thereof. The inserting direction is a direction parallel to the mirror rotation axis R, i.e., the direction parallel to the center axis S of the support surface 24 and the center axis S' of the bearing seat surface 29. The galvano mirror 20 thus inserted is situated such that the support surface 24 is seated on the bearing seat surface 29 and the center axes S and S' correspond to each other.

In this state, the galvano mirror 20 is pressed downward with a predetermined pressure force of, for example, about 100 gf by a fitting tool 80 and the support surface 24 is kept in contact with the bearing seat surface 29. While making them slide on each other, the inclination of the galvano mirror 20 is adjusted by, for example, rotating the mirror 20 about the mirror rotation axis R, i.e., about the Y-axis and the X-axis, thereby to adjust the inclination thereof about the Z-axis parallel to the reflection surface of the mirror 21 with respect to the optical axis of the optical system. Note that this adjustment is carried out by applying light from the laser diode 11 onto the mirror 21 of the galvano mirror 20, by detecting the inclination of the light emitted from the fixed mirror 1b with respect to the reference surface of carriage 2 by means of an auto-collimator, and by automatically controlling the fitting tool 80 by means of a control device not shown or the like.

Further, after adjustment service as to the inclination as described above is completed, the galvano mirror 20 is maintained at the position, and an adhesive agent A is injected and hardened between the galvano mirror 20 and the inner surface of the galvano mirror container section 28, e.g., between the front edge portion and both side surface portions of the base member 22 and the inner surface of the galvano mirror container section 28, or between the support surface 24 and the bearing seat surface 29. The galvano mirror 29 is thereby fixed at a predetermined installation position. Further, thereafter, the fitting tool 80 is pulled upward.

It is noted that the present invention should not be limited to the above embodiment. For example, the curved spring should not be limited to the S-shaped spring but may be Z-shaped, W-shaped or have other curved-shapes. In addition, the present invention should not be limited to an apparatus rotatably supporting the galvano mirror. It can be, of course, applied to other apparatuses rotatably supporting any optical element or optical constituent element.

As has been described above, the width of the curved spring of a plate material is made narrow in the vicinity of the rotation axis of the movable member, whereas the width thereof away from the rotation axis is made wide. Owing to this, if the movable member is rotated, the spring constant due to bending deformation which occurs in the vicinity of the rotation axis, in the plate thickness direction is small. If the movable member is moved in the direction perpendicular to the rotation axis, the spring constant due to bending deformation and shearing deformation which occur to the respective parts in the surface direction is large. It is, therefore, possible to, for example, rotatably support the movable member with a low resistance, to make the amount of the movement in other directions less and to accurately support the movable member. The present invention thus provides great advantage.

It is noted that a person in the art can add other improvements or modifications hitherto than described above. Therefore, more broadened embodiments of the present invention are not limited to the embodiment described above. Accordingly, various modifications can be made without deviating from the basic subject or concept of the present invention by the claims.

What is claimed is:

1. An optical system movable section supporting apparatus using a spring, comprising: a fixed member, a movable member having at least one optical element or optical constituent element installed therein, the spring rotatably supporting the movable member about a predetermined rotation axis with respect to the fixed member, said spring being flat within a plane and having a curved shape within the plane after being installed, and wherein a portion of said spring positioned close to said rotation axis has a narrow width and a portion distant from said rotation axis has a large width.

2. The optical system movable section supporting apparatus using a spring according to claim 1, wherein said spring has a smoothly curved S-shape symmetrical with respect to a central plane, a central portion and both end portions of the spring are positioned close to said rotation axis, a curved portion of the spring is positioned distant from said rotation axis and a width of the curved portion of the spring is set larger than a width of said central portion and widths of said both end portions.

3. The optical system movable section supporting apparatus using a spring according to claim 2, wherein said movable member holds a mirror of a galvano mirror and the S-shaped spring consisting of said plate member is positioned in a plane perpendicular to a reflection surface of said mirror.

4. An optical system movable section supporting apparatus using a spring comprising: a fixed member, a movable member having at least an optical element or optical constituent element installed therein and the spring rotatably supporting the movable member about a predetermined rotation axis with respect to said fixed member, said spring being flat within a plane and curved within the plane after being installed to have a curved portion forming a folded part, wherein a width of said curved portion of said spring is larger than widths of other portions of said spring.

* * * * *